UNITED STATES PATENT OFFICE.

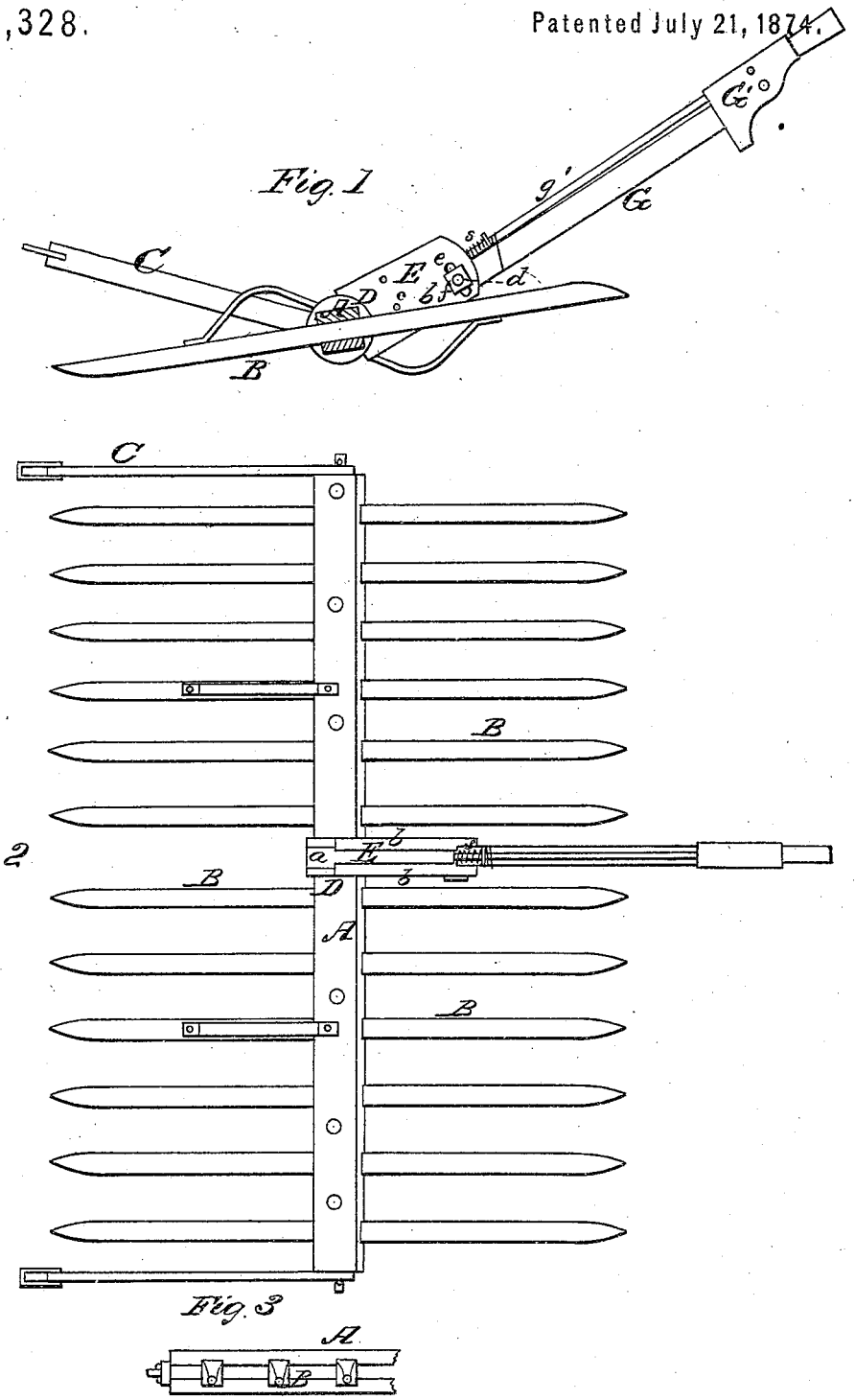

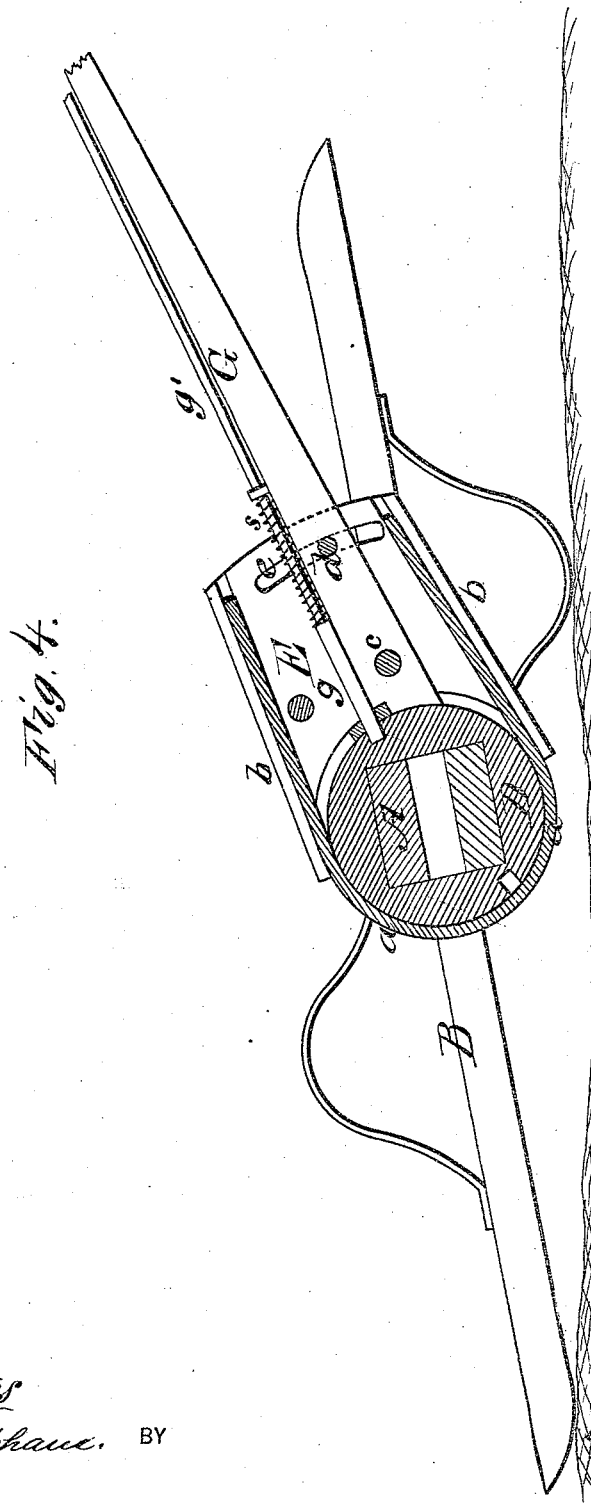

MOSES K. FLORY, OF VIOLA, ILLINOIS.

IMPROVEMENT IN HORSE HAY-RAKES.

Specification forming part of Letters Patent No. 153,328, dated July 21, 1874; application filed May 16, 1874.

*To all whom it may concern:*

Be it known that I, MOSES K. FLORY, of Viola, in the county of Mercer and State of Illinois, have invented a new and valuable Improvement in Hay-Rakes; and I do hereby declare that the following is a full, clear, and exact description of the construction and operation of the same, reference being had to the annexed drawings making a part of this specification and to the letters and figures of reference marked thereon.

Figure 1 of the drawing is a representation of a side view, part sectional, of my improved hay-rake; and Fig. 2 is a plan view, and Fig. 3 is a detail view, showing a portion of the rake-head; and Fig. 4 is a sectional view.

The object of this invention is to improve the horse hay-rake for which Letters Patent were granted to me bearing date October 14, 1873; and the improvement consists in the novel construction and arrangement of the parts, as will be more fully described and explained.

The following is a description of my improvement: In the annexed drawings A designates the head of the revolving rake, and B the teeth thereof. C C are draft-rods, to which the team is hitched, and in which the ends of the head A turns. D designates a circular hub, having an annular groove in its periphery, which receives a strap or yoke, $a$, to which side plates $b\ b$ are secured, constituting a bearing-box, E, in which the rake-head revolves. G designates a handle, which is connected to the plates $b\ b$ by means of a pivot, $c$, which allows this handle to be adjusted vertically in the box E; and, by means of a screw, $d$, which passes transversely through the handle and through curved slots $e$ in the plates $b\ b$, and receives a nut, $f$, on it, the said handle can be secured at any desired point of adjustment.

The rake is held in position for operation by means of a bolt, $g$, which is applied on the end of a rod, $g'$, so as to enter one of two holes in the periphery of the flanged hub D. Rod $g'$ is acted on by a spring, $s$, and it extends along the handle G, and is pivoted to a horn or handle, G', constructed like the horn described in my Letters Patent above referred to. By articulating the horn G' about its pivotal connection to the handle G, the rake can be released so as to turn over, or bolted in raking position.

It will be seen from the above description that the handle G can be adjusted at any desired angle, with respect to the box E, by simply loosening the nut on the bolt or screw $d$, thereby adapting the height of the horn G' to that of the person using the rake.

What I claim as new, and desire to secure by Letters Patent, is—

The adjustable handle G, connected to the box E by a pivot, $c$, and provided with a bolt or screw, $d$, passing transversely through said handle and through curved slots $e$ in the plates $b\ b$, for clamping the handle at any desired point of adjustment, substantially as described, and for the purpose set forth.

In testimony that I claim the above, I have hereunto subscribed my name in the presence of two witnesses.

MOSES K. FLORY.

Witnesses:
 HENRY HOAGLAND,
 EUGENE SMITH.